US012614132B1

(12) United States Patent
Grangier et al.

(10) Patent No.: US 12,614,132 B1
(45) Date of Patent: Apr. 28, 2026

(54) VOLUME BASED VISUALIZATION TOOL FOR SCHEDULING TASKS IN A WAREHOUSE

(71) Applicant: JDA Software Group, Inc., Scottsdale, AZ (US)

(72) Inventors: Philippe Grangier, Montreal (CA); Vincent Raymond, Montreal (CA); Benoit Rochon, Montreal (CA); Marc Brisson, Boucherville (CA); Steven Cheney, Waukesha, WI (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 15 days.

(21) Appl. No.: 16/146,551

(22) Filed: Sep. 28, 2018

Related U.S. Application Data

(60) Provisional application No. 62/683,986, filed on Jun. 12, 2018.

(51) Int. Cl.
| | |
|---|---|
| *G06Q 10/0631* | (2023.01) |
| *G06F 16/904* | (2019.01) |
| *G06Q 10/083* | (2024.01) |

(52) U.S. Cl.
CPC ... *G06Q 10/063114* (2013.01); *G06F 16/904* (2019.01); *G06Q 10/063112* (2013.01); *G06Q 10/083* (2013.01)

(58) Field of Classification Search
CPC .............................................. G06Q 10/03114

(Continued)

(56) References Cited

U.S. PATENT DOCUMENTS

| | | | |
|---|---|---|---|
| 2005/0080658 A1* | 4/2005 | Kohn | G06Q 10/06315 |
| | | | 705/7.14 |
| 2006/0218551 A1* | 9/2006 | Berstis | G06F 9/4881 |
| | | | 718/102 |

(Continued)

FOREIGN PATENT DOCUMENTS

| | | | | |
|---|---|---|---|---|
| AU | 722806 B2 * | 11/1997 | | G06Q 10/06 |
| EP | 1139246 A1 * | 10/2001 | | G06Q 10/10 |

(Continued)

OTHER PUBLICATIONS

"What Makes Rabbit run?" by Michael David Williams; Applied Artificial Intelligence, IntelliGenetics, Menlo Park, California 94025, U.S.A. Available online Aug. 7, 2008 (Year: 2008).*

(Continued)

*Primary Examiner* — Kristin E Gavin

(74) *Attorney, Agent, or Firm* — Spencer Fane LLP; Steven J. Laureanti

(57) ABSTRACT

A system and method are disclosed for displaying a visualization of tasks to be performed across one or more time intervals. Embodiments include receiving two or more tasks from a task database comprising one or more attributes in a table format, the table having two or more rows and two or more columns, adding a column to each of the two or more tasks comprising the volume of tasks to be cumulatively performed during a time interval and adding a column to each of the two or more tasks comprising the cumulative volume due during the time interval. Embodiments also include displaying, on a graphical user interface, a visualization of the cumulative volume due and the cumulative planned curve representing the volume of tasks to be performed across one or more time intervals.

17 Claims, 5 Drawing Sheets

(58) Field of Classification Search
USPC ....................................................... 705/7.13
See application file for complete search history.

(56) References Cited

U.S. PATENT DOCUMENTS

| | | | | |
|---|---|---|---|---|
| 2007/0021998 A1* | 1/2007 | Laithwaite | ....... G06Q 10/06316 | 705/7.26 |
| 2007/0067200 A1* | 3/2007 | Patel | ............. G06Q 10/063114 | 705/7.14 |
| 2007/0094661 A1* | 4/2007 | Baird | .................... G06Q 10/06 | 718/102 |
| 2007/0192157 A1* | 8/2007 | Gooch | ................... G06Q 10/10 | 705/7.41 |
| 2008/0114625 A1* | 5/2008 | Kline | .................... G06Q 10/06 | 705/7.13 |
| 2008/0215414 A1* | 9/2008 | Fehnel | ............. G06Q 10/06311 | 705/7.22 |
| 2008/0270240 A1* | 10/2008 | Chu | ................. G06Q 10/06375 | 434/350 |
| 2008/0294536 A1* | 11/2008 | Taylor | ................. G06Q 10/087 | 705/28 |
| 2009/0173780 A1* | 7/2009 | Ramamoorthy | ............................ G06Q 10/06311 | 235/376 |
| 2011/0288900 A1* | 11/2011 | McQueen | ...... G06Q 10/063116 | 705/7.21 |
| 2014/0136255 A1* | 5/2014 | Grabovski | ..... G06Q 10/063114 | 705/7.14 |
| 2014/0236660 A1* | 8/2014 | Cantor | ............. G06Q 10/06312 | 705/7.23 |
| 2014/0365258 A1* | 12/2014 | Vestal | ............ G06Q 10/063114 | 901/1 |
| 2015/0095082 A1* | 4/2015 | Guntin | .......... G06Q 10/063114 | 705/7.15 |
| 2017/0124531 A1* | 5/2017 | McCormack | .......... G06Q 10/06 | |
| 2018/0182054 A1* | 6/2018 | Yao | ................. G06Q 10/063112 | |
| 2018/0225620 A1* | 8/2018 | Cantrell | ............. G06Q 10/0633 | |

FOREIGN PATENT DOCUMENTS

| | | | | |
|---|---|---|---|---|
| KR | 102135662 B1 * | 7/2020 | ............. G06N 20/00 | |
| WO | WO-2016151505 A1 * | 9/2016 | ......... G05B 19/4182 | |

OTHER PUBLICATIONS

JaxoDraw: A graphical user interface for drawing Feynman Diagrams by D. Binosi et al.; Computer Physics Communications, vol. 161, Issues 1-2, Aug. 2004, pp. 76-86; Available online Jun. 22, 2004 (Year: 2004).*

Larco, José Antonio, et al. "Managing warehouse efficiency and worker discomfort through enhanced storage assignment decisions." International Journal of Production Research 55.21 (2017): 6407-6422. (Year: 2017).*

Vainio, Tanja. Intelligent order scheduling and release in a build to order environment. Diss. Massachusetts Institute of Technology, 2004. (Year: 2004).*

Liang, Conghui, et al. "Automated robot picking system for e-commerce fulfillment warehouse application." The 14th IFToMM World Congress. vol. 1. 2015. (Year: 2015).*

Claes, Daniel, et al. "Decentralised online planning for multi-robot warehouse commissioning." AAMAS'17: Proceedings of the 16th International Conference on Autonomous Agents and Multiagent Systems. vol. 1. ACM, 2017. (Year: 2017).*

* cited by examiner

110

VOLUME BASED VISUALIZATION TOOL FOR SCHEDULING TASKS IN A WAREHOUSE

CROSS-REFERENCE TO RELATED APPLICATIONS

The present disclosure is related to that disclosed in the U.S. Provisional Application No. 62/683,986, filed Jun. 12, 2018, entitled "Volume Based Visualization Tool for Scheduling Tasks in a Warehouse." U.S. Provisional Application No. 62/683,986 is assigned to the assignee of the present application. The subject matter disclosed in U.S. Provisional Application No. 62/683,986 is hereby incorporated by reference into the present disclosure as if fully set forth herein. The present invention hereby claims priority under 35 U.S.C. § 119(e) to U.S. Provisional Application No. 62/683, 986.

TECHNICAL FIELD

The present disclosure relates generally to a warehouse management system and specifically to a volume based visualization tool for scheduling tasks in a warehouse.

BACKGROUND

In a warehouse environment, each task has a particular due time, an estimated duration required to complete the particular task and an associated skill level of a warehouse worker, required to perform the particular task. However, determining the volume of tasks that are planned to do in a future time interval, which volume of tasks is required to be done in the future time interval, the duration required to complete the particular tasks and how many workers to schedule and/or the skill level of the particular workers. These factors and constraints have proven challenging for traditional solutions to efficiently solve the tasks scheduling problem in a warehouse. The complexity to determine the tasks scheduling problem in a warehouse with so many factors and constraints is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
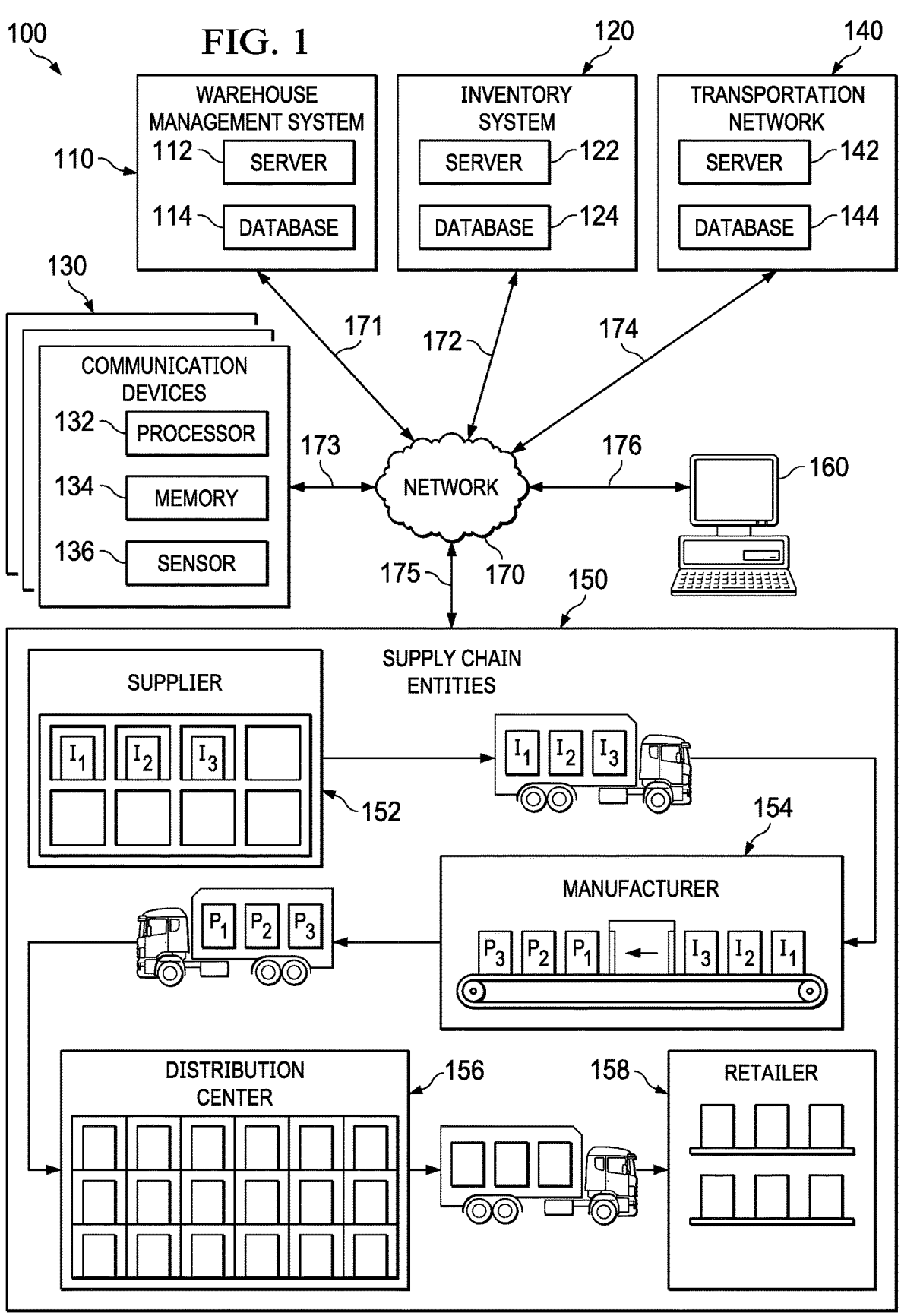
FIG. 1 illustrates an exemplary system, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to a visualizing tasks scheduling in a warehouse of one or more supply chain entities. According to embodiments, each task in a warehouse environment has a certain due time, an estimated duration and a required skill level. In addition, and as described in more detail below, aspects of the following disclosure evaluate and determine which volume of tasks is planned to be completed verses which volume of tasks are to be completed, to allow for a quick identification of under-performance or over-performance. In addition, aspects of the following disclosure anticipate future situations of the warehouse to determine high and low demands and adjust task schedules accordingly. Although, particular embodiments are shown including future scheduling of the warehouse, embodiments contemplate a symmetrical relationship of visualizing historical task scheduling.

FIG. 1 illustrates an exemplary system 100, according to a first embodiment. System 100 comprises warehouse management system 110, inventory system 120, one or more communication devices 130, transportation network 140, one or more supply chain entities 150, computer 160, network 170, and communication links 171-176. Although a single warehouse management system 110, a single inventory system 120, one or more communication devices 130, a single transportation network 140, one or more supply chain entities 150, a single computer 160, and a single network 170, are shown and described, embodiments contemplate any number of warehouse management systems, communication devices, inventory systems, transportation systems, supply chain entities, computers, or networks, according to particular needs.

In one embodiment, warehouse management system 110 comprises server 112 and database 114. According to embodiments, server 112 comprises one or more modules that manage and operate warehouse operations, generate warehouse tasks, scheduling tasks, controls inventory and transportation management. According to embodiments, warehouse management system 110 receives tasks from one or more supply chain entities 150, and stores tasks and related task attributes in database 114. Database 114 comprises one or more databases or other data storage arrangements at one or more locations local to or remote from warehouse management system 110. As described more fully below, warehouse management system 110 schedules tasks over time intervals and dynamically assigns priorities to tasks and then tasks to workers.

Inventory system 120 comprises server 122 and database 124. Server 122 of inventory system 120 is configured to receive and transmit item data, including item identifiers, inventory levels, and other like data about one or more items at one or more locations in one or more supply chain entities 150. Server 122 stores and retrieves item data from database 124 or from one or more locations in system 100.

One or more communication devices 130 comprise one or more processors 132, memory 134, one or more sensors 136, and may include any suitable input device, output device, fixed or removable computer-readable storage media, or the like. According to embodiments, one or more communication devices 130 comprise an electronic device that receives imaging information from one or more sensors 136 or from one or more databases in system 100. According to embodiments, one or more communication devices 130 identifies items near the one or more sensors 136 and generates a mapping of the item in system 100. As explained in more detail below, warehouse management system 110, inventory system 120, one or more communication devices 130, and transportation network 140 may use the mapping of an item to locate the item in system 100. The location of the item is then used to coordinate the storage and transportation of items in system 100 and to implement a shipping and inventory plan determined by warehouse management system 110 and/or one or more other factors described herein.

One or more communication devices 130 may comprise a mobile handheld electronic device such as, for example, a smartphone, a tablet computer, a wireless device, or the like. In addition, or as an alternative, one or more communication devices 130 comprises one or more networked electronic devices configured to transmit item identity information to one or more databases as an item passes by or is scanned by sensor 136. This may include, for example, a stationary scanner located at one or more supply chain entities 150 that identifies items as the items pass near the scanner. The one or more sensors 136 of one or more communication devices 130 may comprise an imaging sensor, such as, a camera, scanner, electronic eye, photodiode, charged coupled device (CCD), or any other electronic sensor that detects images of objects. In addition, or as an alternative, the one or more sensors may comprise a radio receiver and/or transmitter configured to read an electronic tag, such as, for example, a radio-frequency identification (RFID) tag.

In addition, or as an alternative, each of the one or more items may be represented in system 100 by an identifier, including, for example, Stock-Keeping Unit (SKU), Universal Product Code (UPC), serial number, barcode, tag, RFID, or any other object that encodes identifying information. As discussed above, one or more communication devices 130 may generate a mapping of one or more items in system 100 by scanning an identifier or object associated with an item and identifying the item based, at least in part, on the scan. Additionally, the one or more sensors of one or more communication devices 130 may be located at one or more locations local to, or remote from, one or more communication devices 130, including, for example, the one or more sensors integrated into one or more communication devices 130 or the one or more sensors 136 distantly located from one or more communication devices 130 and communicatively coupled with one or more communication devices 130. According to some embodiments, the one or more sensors 136 of one or more communication devices 130, and any additional sensors local to, or remote from, system 100 may be communicatively coupled such that any sensor 136 may be configured to communicate directly or indirectly with warehouse management system 110, inventory system 120, one or more communication devices 130, transportation network 140, one or more supply chain entities 150, computer 160, and/or network 170 using one or more communication links 171-176.

Transportation network 140 comprises server 142 and database 144. According to embodiments, transportation network 140 directs the one or more transportation vehicles to ship one or more items between one or more supply chain entities 150, based, at least in part, on a task and inventory plan determined by warehouse management system 110, the number of items currently in stock at one or more supply chain entities 150, the number of items currently in transit in transportation network 140, forecasted demand, a supply chain disruption, and/or one or more other factors described herein. The transportation vehicles comprise, for example, any number of trucks, cars, vans, boats, airplanes, unmanned aerial vehicles (UAVs), cranes, robotic machinery, or the like. The transportation vehicles may comprise radio, satellite, or other communication that communicates location information (such as, for example, geographic coordinates, distance from a location, global positioning satellite (GPS) information, or the like) with warehouse management system 110, inventory system 120, one or more communication devices 130, transportation network 140, and/or one or more supply chain entities 150 to identify the location of the transportation vehicle and the location of any inventory or shipment located on the transportation vehicle.

As shown in FIG. 1, system 100 operates on one or more computers 160 that are integral to or separate from the hardware and/or software that support warehouse management system 110, inventory system 120, one or more communication devices 130, transportation network 140, and one or more supply chain entities 150. System 100 comprising warehouse management system 110, inventory system 120, one or more communication devices 130, transportation network 140, and one or more supply chain entities 150 may operate on one or more computers 160 that are integral to or separate from the hardware and/or software that support warehouse management system 110, inventory system 120, one or more communication devices 130, transportation network 140, and one or more supply chain entities 150. Computers 160 may include any suitable input device, such as a keypad, mouse, touch screen, microphone, or other device to input information. An output device may convey information associated with the operation of system 100, including digital or analog data, visual information, or audio information. Computer 160 may include fixed or removable computer-readable storage media, including a non-transitory computer readable medium, magnetic computer disks, flash drives, CD-ROM, in-memory device or other suitable media to receive output from and provide input to system 100.

Computer 160 may include one or more processors and associated memory to execute instructions and manipulate information according to the operation of system 100 and any of the methods described herein. In addition, or as an alternative, embodiments contemplate executing the instructions on computer 160 that cause computer 160 to perform functions of the method. Further examples may also include articles of manufacture including tangible non-transitory computer-readable media that have computer-readable instructions encoded thereon, and the instructions may comprise instructions to perform functions of the methods described herein.

In addition, and as discussed herein, system 100 may comprise a cloud-based computing system having processing and storage devices at one or more locations, local to, or remote from warehouse management system 110, inventory system 120, one or more communication devices 130, transportation network 140, and one or more supply chain entities 150. In addition, each of one or more computers 160 may be a work station, personal computer (PC), network computer, notebook computer, tablet, personal digital assistant (PDA), cell phone, telephone, smartphone, wireless data port, mobile device, head-mounted display, augmented or virtual reality headset, or any other suitable computing device. In an embodiment, one or more users may be associated with warehouse management system 110, inventory system 120, one or more communication devices 130, transportation network 140, and one or more supply chain entities 150. These one or more users may include, for example, a "manager" or a "planner" that schedule tasks by dynamically assigning priorities to tasks and then tasks to workers and/or one or more related tasks within system 100. In addition, or as an alternative, these one or more users within system 100 may include, for example, one or more computers 160 programmed to autonomously handle, among other things, determining task scheduling by assigning priority to tasks and assign tasks to workers and/or one or more related tasks within system 100.

One or more supply chain entities 150 represent one or more supply chain networks, including one or more enterprises, such as, for example networks of the one or more suppliers 152, manufacturers 154, distribution centers 156, retailers 158 (including brick and mortar and online stores), customers, and/or the like. The suppliers may be any suitable entity that offers to sell or otherwise provides one or more items (i.e., materials, components, or products) to the one or more manufacturers 154. Suppliers 152 may comprise automated distribution systems that automatically transport products to the one or more manufacturers 154 based, at least in part, on a shipping and inventory plan determined by warehouse management system 110 and/or one or more other factors described herein.

Manufacturers 154 may be any suitable entity that manufactures at least one product. Manufacturers 154 may use one or more items during the manufacturing process to produce any manufactured, fabricated, assembled, or otherwise processed item, material, component, good, or product. In one embodiment, a product represents an item ready to be supplied to, for example, one or more supply chain entities 150 in system 100, such as the retailers 158, an item that needs further processing, or any other item. Manufacturers 154 may, for example, produce and sell a product to suppliers 152, other manufacturers 154, distribution centers 156, retailers 158, a customer, or any other suitable person or entity. Manufacturers 154 may comprise automated robotic production machinery that produce products based, at least in part, on a shipping and inventory plan determined by warehouse management system 110 and/or one or more other factors described herein.

Distribution centers 156 may be any suitable entity that offers to store or otherwise distribute at least one product to one or more retailers 158 and/or customers. Distribution centers 156 may, for example, receive a product from a first one or more supply chain entities 150 in system 100 and store and transport the product for a second one or more supply chain entities 150. Distribution centers 156 may comprise automated warehousing systems that automatically remove products from and place products into inventory based, at least in part, on a shipping and inventory plan determined by warehouse management system 110 and/or one or more other factors described herein.

Retailers 158 may be any suitable entity that obtains one or more products to sell to one or more customers. Retailers 158 may comprise any online or brick-and-mortar store, including stores with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of the retailers 158 based on computer-generated instructions or automatically by machinery to place products in a desired location in retailers 158 and which may be based, at least in part, on a shipping and inventory plan determined by warehouse management system 110 and/or one or more other factors described herein.

Although one or more supply chain entities 150 are shown and described as separate and distinct entities, the same entity may simultaneously act as any one of one or more supply chain entities 150. For example, one or more supply chain entities 150 acting as a manufacturer can produce a product, and the same one or more supply chain entities 150 can act as a supplier to supply an item to itself or another one or more supply chain entities 150. Although one example of a system is shown and described, embodiments contemplate any configuration of system 100, without departing from the scope described herein.

In one embodiment, warehouse management system 110 is coupled with network 170 using communication link 171, which may be any wireline, wireless, or other link suitable to support data communications between warehouse management system 110 and network 170 during operation of system 100. Inventory system 120 are coupled with network 170 using communication link 172, which may be any wireline, wireless, or other link suitable to support data communications between inventory system 120 and network 170 during operation of system 100. One or more communication devices 130 are coupled with network 170 using communication link 173, which may be any wireline, wireless, or other link suitable to support data communications between one or more communication devices 130 and network 170 during operation of system 100.

Transportation network 140 are coupled with network 170 using communication link 174, which may be any wireline, wireless, or other link suitable to support data communications between transportation network 140 and network 170 during operation of system 100. One or more supply chain entities 150 are coupled with network 170 using communication link 175, which may be any wireline, wireless, or other link suitable to support data communications between one or more supply chain entities 150 and network 170 during operation of system 100. Computers 160 are coupled with network 170 using communication link 176, which may be any wireline, wireless, or other link suitable to support data communications between computers 160 and network 170 during operation of system 100.

Although communication links 171-176 are shown as generally coupling warehouse management system 110, inventory system 120, one or more communication devices 130, transportation network 140, one or more supply chain entities 150, and computers 160 with network 170, warehouse management system 110, inventory system 120, one or more communication devices 130, transportation network 140, one or more supply chain entities 150, and computers 160 may communicate directly with warehouse management system 110, one or more communication devices 130, one or more supply chain entities 150, and/or computers 160, according to particular needs.

In another embodiment, network 170 includes the Internet and any appropriate local area networks (LANs), metropolitan area networks (MANs), or wide area networks (WANs) coupling warehouse management system 110, inventory system 120, one or more communication devices 130, transportation network 140, one or more supply chain entities 150, and computers 160. For example, data may be maintained by warehouse management system 110 and one or more communication devices 130 at one or more locations external to warehouse management system 110, inventory system 120, one or more communication devices 130, transportation network 140, and one or more supply chain entities 150 and made available to one or more associated users of one or supply chain entities 150 using network 170 or in any other appropriate manner. Those skilled in the art will recognize that the complete structure and operation of the communication network and other components within system 100 are not depicted or described. Embodiments may be employed in conjunction with known communications networks and other components.

In accordance with the principles of embodiments described herein, warehouse management system 110 may schedule tasks and then assign a priority to the tasks. Furthermore, warehouse management system 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 150, and the configuration and quantity of packaging and shipping of items based on one or more groupings and/or current inventory or production levels. For example, the methods described herein may include computers 160 receiving product data from automated machinery having at least one sensor and the product data corresponding to an item detected by the automated machinery. The received product data may include an image of the item, an identifier, as described above, and/or other product data associated with the item (dimensions, texture, estimated weight, and any other like data). The method may further include computers 160 looking up the received product data in database 114 of warehouse management system 110 to identify the item corresponding to the product data received from the automated machinery.

Computers 160 may also receive, from one or more sensors 136 of one or more communication devices 130 and/or from sensor 136 associated with one or more communication devices 130, a current location of an identified object. Based on the identification of the object, computers 160 may also identify (or alternatively generate) a first mapping in database 114, where the first mapping is associated with the current location of the identified object. Computers 160 may also identify a second mapping in database 116, where the second mapping is associated with a past location of the identified object. Computers 160 may also compare the first mapping and the second mapping to determine if the current location of the identified object in the first mapping is different than the past location of the identified object in the second mapping. Computers 160 may then send instructions to the automated machinery based, as least in part, on one or more differences between the first mapping and the second mapping such as, for example, to locate items to add to or remove from an inventory of or package for one or more supply chain entities 150.

Figure 2:
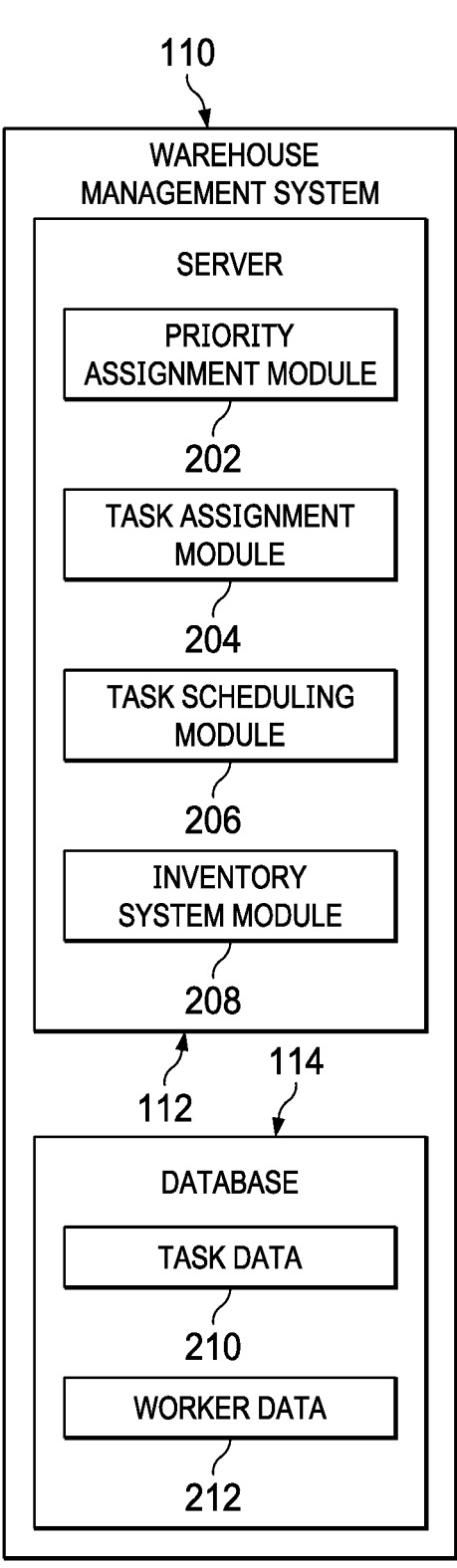
FIG. 2 illustrates the warehouse management system of FIG. 1 in greater detail, according to an embodiment.

FIG. 2 illustrates warehouse management system 110 of FIG. 1 in greater detail, according to an embodiment. As discussed above, warehouse management system 110 may comprise server 112 and database 114. Although warehouse management system 110 is shown as having a single server 112 and a single database 114, embodiments contemplate any suitable number of servers or databases internal to or externally coupled with warehouse management system 110. Server 112 of warehouse management system 110 may comprise priority assignment module 202, task assignment module 204, task scheduling module 206, and inventory system module 208. Although a single priority assignment module 202, a single task assignment module 204, a single task scheduling module 206 and a single inventory system module 208 are shown and described, embodiments contemplate any number of modules located at one or more locations, external or internal to warehouse management system 110.

According to embodiments, warehouse management system 110 schedules tasks by dynamically assigning priorities to tasks and then tasks to workers. In addition, priority assignment module 202 assigns priorities to the one or more tasks by, for example, receiving and grouping tasks, estimating the latest feasible start time of each group, and determining a priority based on the latest feasible start time. Task assignment module 204 assigns tasks to workers and task schedule module 206 assigns schedules to tasks depending on a due time, an estimated duration and a required skill set. Although the following discussion describes tasks being scheduled and assigned to workers, according to embodiments, schedules and tasks may be assigned to machinery or robotic machinery configured to autonomously complete the task in response to a task assignment from warehouse management system 110. In addition, or as an alternative, some workers may have restrictions and permissions, which limit the tasks that may be assigned to that worker. As an example only and not by way of limitation, tasks requiring operating a forklift or handling hazardous material may only be assigned to workers who have the appropriate licensing or safety certification. Some workers may have weight restrictions that limit tasks requiring lifting too much weight. Some tasks may be assigned only to workers with the appropriate security clearance or authority. Although a particular example of restrictions and permissions are discussed, embodiments contemplate using any suitable factor to schedule and assign tasks to a worker that may perform the task.

According to embodiments, task assignment module 204 assigns a task to workers based on permissions, priority, and proximity. Task assignment module 204 may also send notifications to perform a task to one or more communication devices 130 associated with a worker or workers that are assigned a task. In addition, or as an alternative, task assignment module 204 may generate an interface, such as a graphical user interface, comprising one or more interactive elements for selecting and configuring assignment of task strategies. According to embodiments, task assignment module 204 communicates with one or more communication devices 130 to display one or more visual elements and one or more interactive elements on one or more displays. The one or more visual elements may comprise text or graphics that convey information through visual cues. For example, the one or more visual elements may comprise a map of a warehouse of the one or more supply chain entities 150 and an indication of where in warehouse 150 a task is to be completed.

Inventory system module 208 is configured to receive, store, and transmit item data, including item location data, inventory levels, and other like data about one or more items at one or more locations in system 100. Inventory system module 208 is configured to store and retrieve item information in the one or more databases associated with warehouse management system 110 or one or more supply chain entities 150.

Database 114 of warehouse management system 110 may comprise one or more databases or other data storage arrangement at one or more locations, local to, or remote from, the server of warehouse management system 110. Database 114 comprises, for example, task data 210 and worker data 212. Although, database 114 is shown and described as comprising task data 210 and worker data 212, embodiments contemplate any suitable number or combination of these, located at one or more locations, local to, or remote from, warehouse management system 110, according to particular needs.

As discussed above, warehouse management system 110 receives tasks from one or more supply chain entities 150. According to embodiments, warehouse management system 110 stores tasks and related task attributes in task data 210. A task may comprise a picking task, where an item in a first location is moved to a second location, such as packing or unpacking a container, loading or unloading a vehicle, placing items in or removing items from an inventory, transporting items, preparing transportation documentation, and the like. Although tasks are described in connection with warehouse task assignment, embodiments contemplate any suitable tasks associated with any one or more supply chain entities 150, according to particular needs. According to embodiments, warehouse management system 110 stores restrictions and permissions in worker data 212. Worker data 212 may comprise data associated with workers, including but not limited to, permissions, restrictions, personal information, work zone assignment, current location, identification information, and the like.

As explained in more detail below, embodiments of the current disclosure visualize task scheduling by dynamically assigning priorities to tasks and then tasks to workers. To further illustrate the method of visualizing tasks scheduling, an example is now given.

TABLE 1

| Skill | Time Interval | Volume performed/planned | Volume due |
|-------|---------------|--------------------------|------------|
| A | 06:00, 08:00 | 250 h | 120 h |
| B | 06:00, 08:00 | 120 h | 120 h |
| A | 08:00, 11:00 | 150 h | 280 h |
| B | 08:00, 11:00 | 160 h | 40 h |
| . . . | | | |

In the following example, TABLE 1 illustrates a set of four tasks received by task scheduling module 206 from database 114 or from one or more databases of system 100, which, as discussed in more detail below, may change the scheduling of tasks assigned to one or more resources.

According to embodiments, the attributes associated with each task comprise, for example, a skills level required to perform the task (Skill), a list of disjoint time intervals, a volume of tasks to be performed during the time interval and the volume due. Task scheduling module 206 receives tasks from the task data 210 of database 114 and performs a series of actions to determine and associate a schedule for the list of tasks. As an example only and not by way of limitation, a skill may include loading a truck, unloading a truck, handling heavy materials, packing a container, unpacking a container, operating a forklift, handling hazardous material, or other like skills.

Continuing with this example, and as shown in TABLE 1, a first time interval is from 6:00 am to 8:00 am comprises skill level of A, the volume of tasks that is planned to be performed is 250 hours of work, and the volume due by the end of the time interval (8:00 am) is to complete at least 120 hours in order to meet the deadline. The second time interval is from 6:00 am to 8:00 am and comprises a skill level of B, the volume of tasks that is planned to be performed is 120 hours of work, and the volume due by the end of the time interval (8:00 am) is to complete at least 120 hours in order to meet the deadline. The third time interval is from 8:00 am to 11:00 am and comprises a skill level of A, the volume of tasks that is planned to be performed is 150 hours of work, and the volume due by the end of the time interval (11:00 am) is to complete at least 280 hours in order to meet the deadline. The fourth time interval from 8:00 am to 11:00 am comprises a skill level of B, the volume of tasks that is planned to be performed is 160 hours of work, and the volume due by the end of the time interval (11:00 am) is to complete at least 40 hours in order to meet the deadline. Although a particular number of tasks is shown and described as four, embodiments contemplate any number of tasks, according to particular needs.

TABLE 2

| Skill | Time Interval | Volume performed/ planned | Volume due | Cumulative performed/ planned | Cumulative due |
|-------|---------------|---------------------------|------------|-------------------------------|----------------|
| A | 6 am, 8 am | 250 h | 120 h | 250 h | 120 h |
| A | 8 am, 11 am | 150 h | 280 h | 400 h | 400 h |
| A | 11 am, 2 pm | 200 h | 100 h | 600 h | 500 h |

TABLE 2 illustrates a set of three tasks including two additional columns (cumulative performed/planned and cumulative due) and computes the cumulative volume based on, for example, TABLE 1 and received by task scheduling module 206 of warehouse management system 110. According to embodiments, task scheduling module 206 adds a first additional column (cumulative performed/planned) for the volume of tasks to be cumulatively performed during the time interval and for the skill level required to perform the task. In addition, task scheduling module 206 adds a second additional column (cumulative due) for the cumulative volume due during the time interval and for the skill level required to perform the task. Task scheduling module 206 stores the new list of tasks table in the task data 210 of database 114.

Continuing with this example, and as shown in TABLE 2, the first time interval from 6:00 am to 8:00 am comprises a skill level of A and the cumulative volume of tasks is 250 hours of work and 120 hours of work is planned to be performed before 8 am. The second time interval from 8:00 am to 11:00 am comprises a skill level of A and the cumulative volume of tasks is 400 hours of work (which is the sum of 250 hours of the first time interval and 150 hours of the second time interval) and 400 hours of work is planned to be performed before 11 am (which is the sum of 120 hours of the first time interval and 280 hours of the second time interval). The third time interval from 11:00 am to 2:00 pm comprises a skill level of A and the cumulative volume of tasks is 600 hours of work (which is the sum of 250 hours of the first time interval, 150 hours of the second time interval and 200 hours of the third time interval) and 500 hours of work is planned to be performed before 11 am (which is the sum of 120 hours of the first time interval, 280 hours of the second time interval and 100 hours of the third time interval). Although a particular number of tasks having a volume of tasks to be cumulatively performed and cumulatively due during the time interval and for the skill required is shown and described, embodiments contemplate any number of tasks having any volume of tasks cumulative performed or due, according to particular needs. After computing the cumulative volume, task scheduling module 206 displays on a graphical user interface the cumulative planned and cumulative due over time and cumulative volume.

Figure 3:
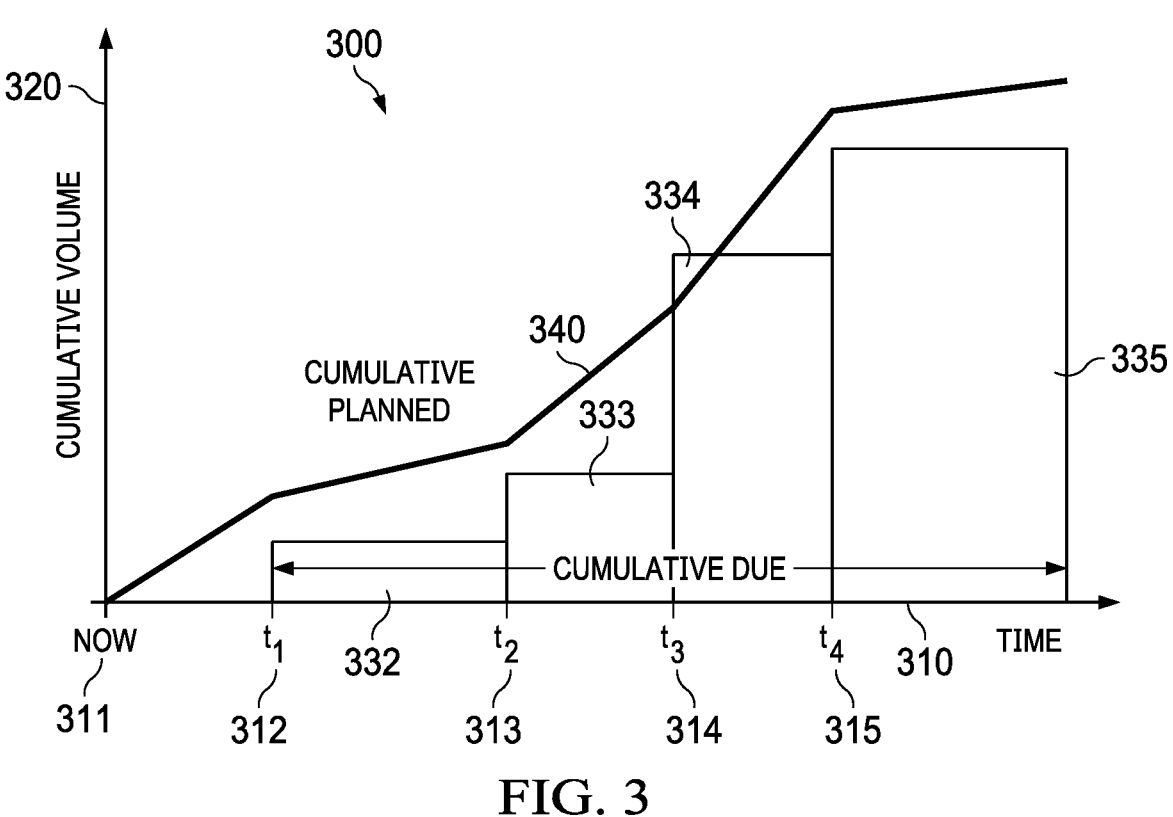
FIG. 3 illustrates an exemplary cumulative planned curve associated with one or more tasks, according to an embodiment.

FIG. 3 illustrates an exemplary cumulative planned curve 300 associated with one or more tasks, according to an embodiment. According to embodiments, the x-axis represents time intervals 310 starting at "now" 311 and the y-axis represents the cumulative volume 320. As shown in FIG. 3, series of blocks 332-335 represents the cumulative volume 320 due by time intervals 311-315. For example, first block 332 represents the cumulative volume 320 that is due by time $t_1$ 312, second block 333 represents the cumulative volume that is due by time $t_2$ 313, third block 334 represents the cumulative volume 320 that is due by time $t_3$ 314, and fourth block 335 represents the cumulative volume 320 that is due by time $t_4$ 315. In addition, task scheduling module 206 plots cumulative planned curve 340 representing the volume of tasks to be cumulatively performed at a time interval 311-315. As illustrated, the margin at $t_1$, 312, $t_2$ 313, and $t_4$ 315 of cumulative planned curve 340 indicates that the volume of tasks will be performed, however, the margin at $t_3$ 314 indicates that the volume of tasks will not be achieved. That is, at $t_3$ 314, cumulative volume 320 at block 334 extends above cumulative planned curve 340 which indicates that the volume of tasks will not be achieved by that respective time interval 310.

Figure 4:
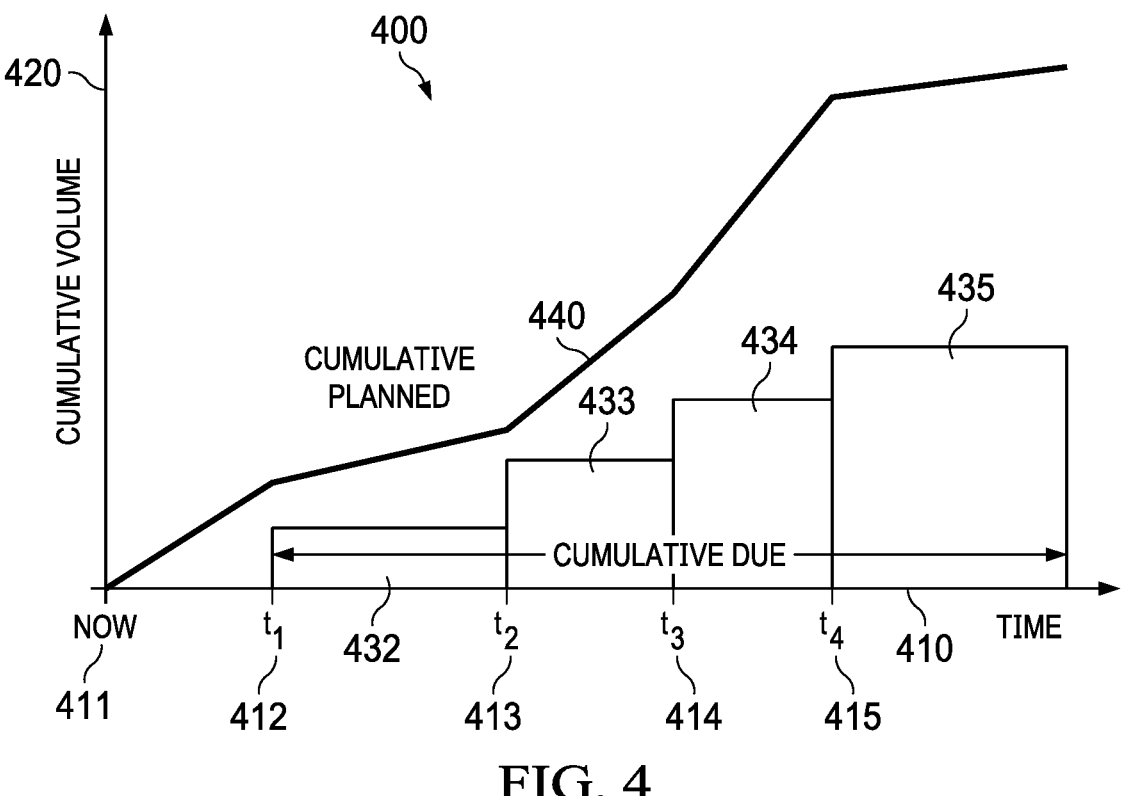
FIG. 4 illustrates another exemplary cumulative planned curve associated with one or more tasks, according to an embodiment.

FIG. 4 illustrates another exemplary cumulative planned curve 400 associated with one or more tasks, according to an embodiment. As illustrated, the margin at time $t_1$ 412 and time $t_2$ 413 of the cumulative planned curve 440 indicates that the volume of tasks will be performed, which was also illustrated in FIG. 3, however, the margin at time $t_3$ 414 and time $t_4$ 415 is substantially higher in FIG. 4, as compared with FIG. 3, indicating that the volume of tasks will be achieved at time $t_3$ 414 and time $t_4$ 415 of FIG. 4.

Figure 5:
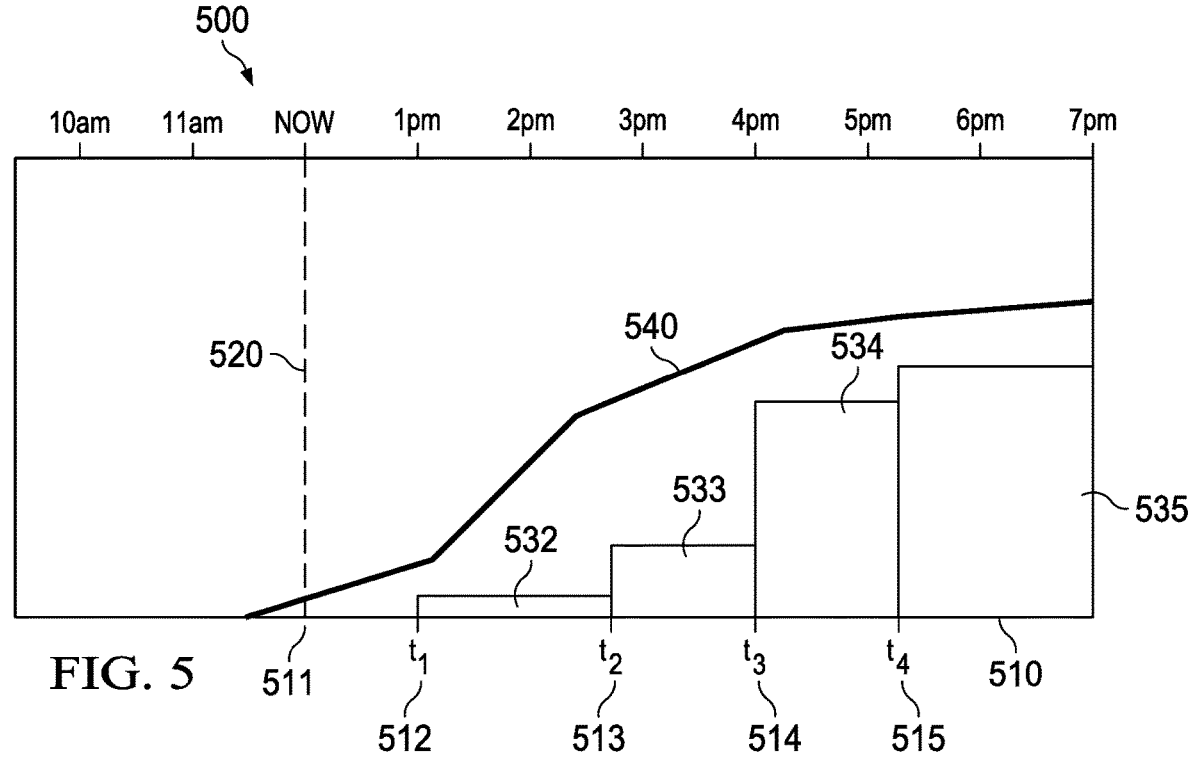
FIG. 5 illustrates another exemplary cumulative planned curve wherein the x-axis represents time intervals and the y-axis represents the cumulative volume, according to embodiments.

FIG. 5 illustrates another exemplary cumulative planned curve 500 wherein the x-axis represents time intervals 510, having a vertical line at "now" 511 and the y-axis represents the cumulative volume 520, according to embodiments. As shown in FIG. 5, series of blocks 532-535 represents the cumulative volume 520 due by time intervals 511-515. For example, on the x-axis 510, time $t_1$ 512 1:00 pm corresponds to a certain amount of volume of tasks to be done, likewise, the same for time intervals time $t_2$ 512 2:45 pm, time $t_3$ 514 4:00 pm, and time $t_4$ 515 5:15 pm. As discussed herein, cumulative planned curve 540 represents the volume of tasks to be cumulatively performed at time intervals. According to embodiments, task scheduling module 206 visualizes the cumulative volume due and the cumulative planned, such that, as shown above, cumulative planned curve 540 indicates that the volume of tasks will be performed across all time intervals 511-515.

After task scheduling module 206 displays on a graphical user interface the cumulative planned and cumulative due over time and cumulative volume, priority assignment module 202 assigns priorities levels to the tasks.

Figure 6:
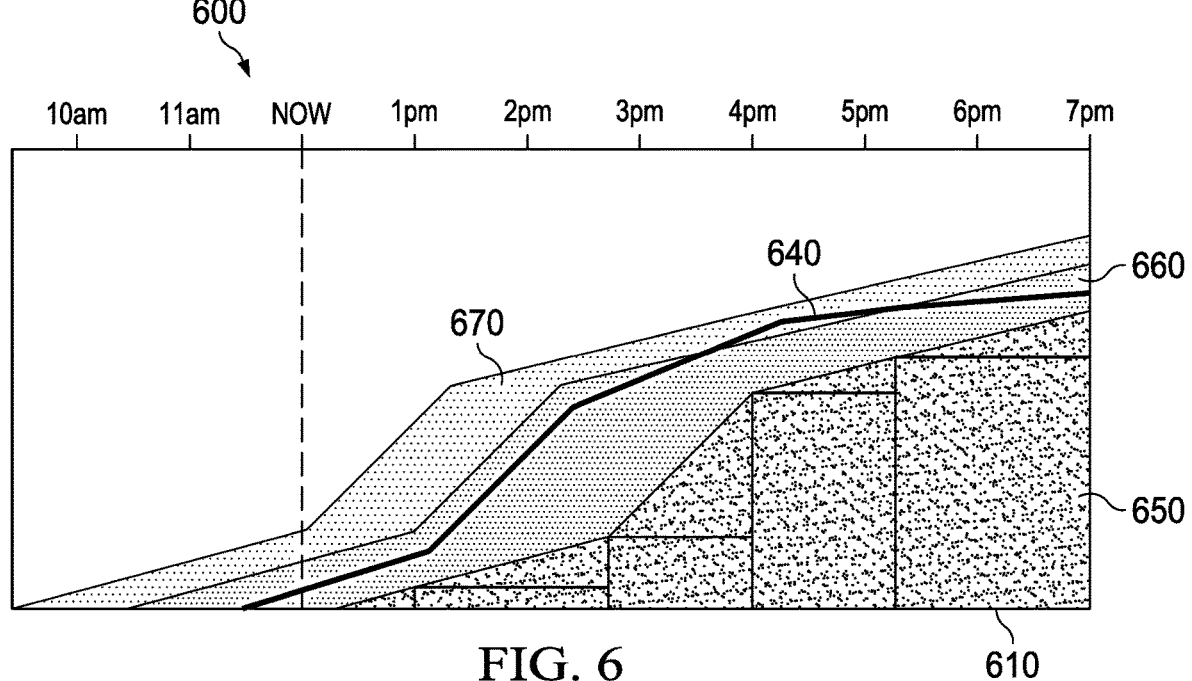
FIG. 6 illustrates another exemplary cumulative planned curve comprising priority levels, according to embodiments.

FIG. 6 illustrates another exemplary cumulative planned curve 600 comprising priority levels 650-670, according to embodiments. According to embodiments, priority assignment module 202 overlays priority levels having a margin around the tasks to be performed. For example, in a warehouse environment, of the one or more supply chain entities 150, assigning a task to close to a deadline results in a loss of efficiency. Therefore, providing a margin to complete a task before it is due, increases the efficiency of the warehouse processes. As shown in FIG. 6, priority assignment module 202 creates and overlays three priority levels 650-670, a high priority level 650, a medium priority level 660, and a low priority level 670. Although a particular number of priority levels is shown and described as three priority levels, embodiments contemplate any number of priority levels, according to particular needs.

Continuing with this example, if cumulative planned curve 640 is in the high priority level the warehouse of one or more supply chain entities 150 will be inefficient at that particular time interval 610. If cumulative planned curve 640 is in medium priority level 660 the task at that time interval 610 will be executed in a marginally efficient manner. If cumulative planned curve 640 is in green priority level 670, this may be more optimal, because the tasks are being executed as efficiently and as smoothly, and with ample margin. If cumulative planned curve 640 is above low priority level 670, then, this may indicate inefficiency in the number of workers on the floor at that time interval 610 and that some of the workers may need to be sent home for that particular shift. Accordingly, FIG. 6 provides a visual indication of the actual workload from high priority level 650, medium priority level 660 and low priority level 670.

Figure 7:
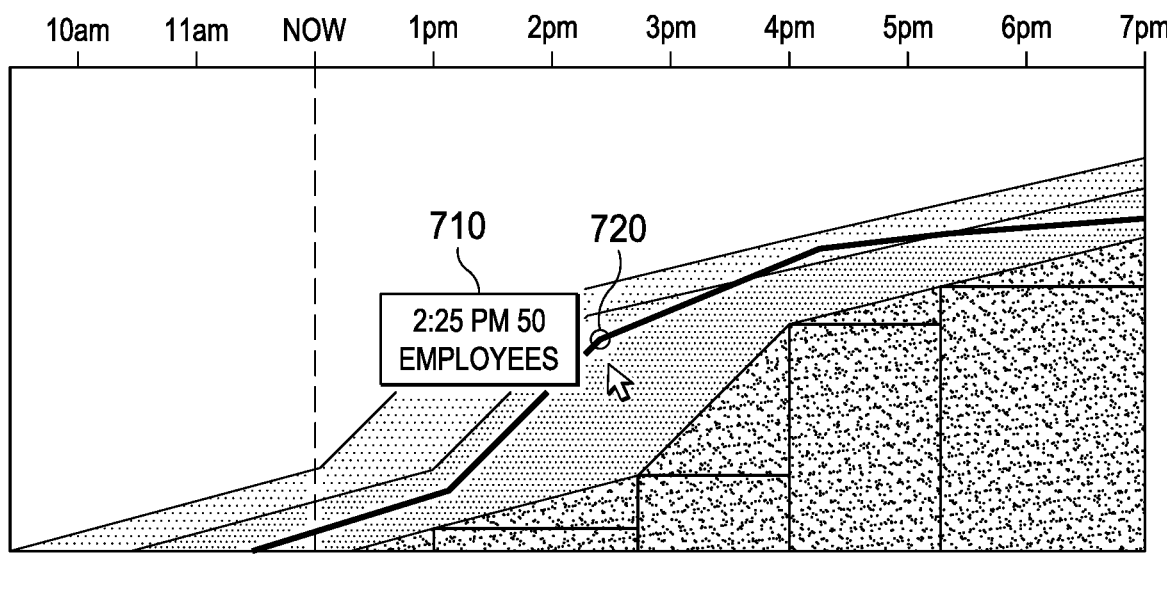
FIG. 7 illustrates the exemplary cumulative planned curve comprising priority levels of FIG. 6 including a clickable function, according to embodiments.

FIG. 7 illustrates the exemplary cumulative planned curve 640 comprising priority levels 650-670 of FIG. 6 including a clickable function, according to embodiments. According to embodiments, task scheduling module 206 allows a user to click on cumulative planned curve 640 and/or mouse-over cumulative planned curve 640 to display a pop-up display 710 indicating worker or task information, such as, for example, the number of workers, or the task, at that particular time interval 610. For example, as shown in FIG. 7, a user has clicked on, or otherwise moused-over the point 720 of the time interval 610 at 2:25 pm and pop-up display 710 indicates that there are 50 employees planned to be working on the floor of the warehouse of one or more supply chain entities 150.

Figure 8:
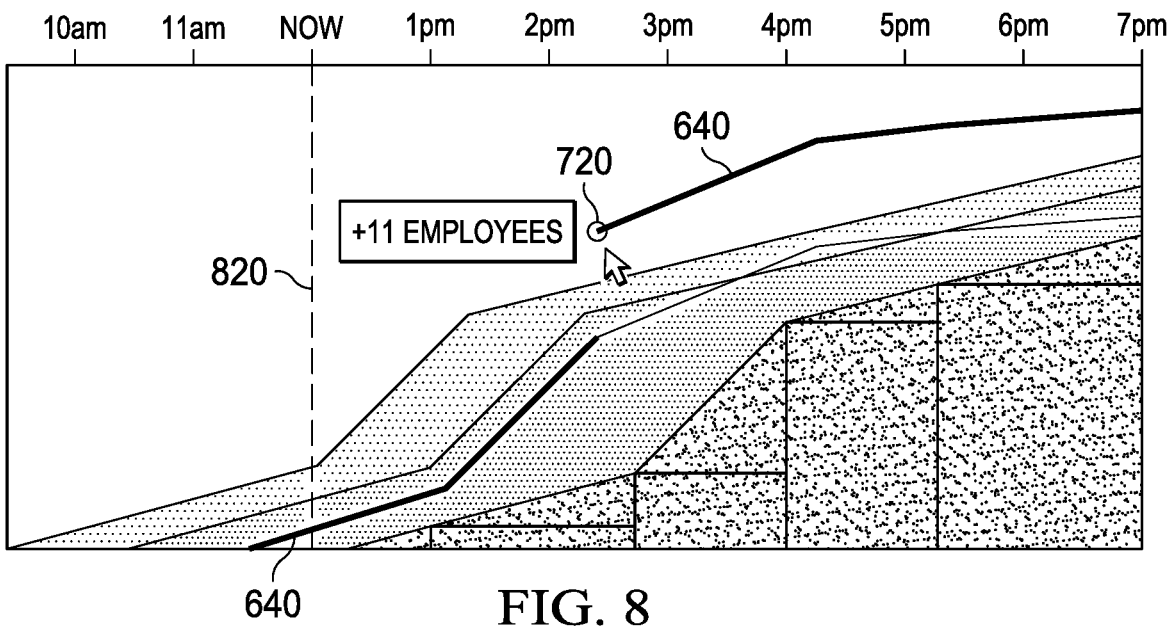
FIG. 8 illustrates exemplary cumulative planned curve, including the clickable function of FIG. 7, according to embodiments.

FIG. 8 illustrates exemplary cumulative planned curve 640, including the clickable function of FIG. 7, according to embodiments. According to embodiments, task scheduling module 206 allows a user to drag and drop the point 720 that was clicked in FIG. 7 to visually display what resources are required to move to a different priority level 650-670. For example, as shown in FIG. 8, the user has clicked on, or otherwise moused-over the point 720 of the time interval 610 at 2:25 pm and pop-up display 710 indicates that there would need to be an additional 11 employees working on the floor of the warehouse of one or more supply chain entities 150 to move from priority level 660 to achieve a lower priority level. Accordingly, by clicking on the cumulative planned curve 640 and dragging cumulative planned curve 640 along the y-axis that represents the cumulative volume 820, task scheduling module 206 recalculates the resources from worker data 212 to determine an increase in workers or a decrease in workers.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A warehouse management system, comprising:
a task database and a computer comprising a processor and memory, the computer configured to:
 receive two or more tasks from the task database comprising one or more attributes in a table format, the table having two or more rows and two or more columns;
 add a column to each of the two or more tasks comprising a volume of tasks to be cumulatively performed during a time interval;
 add a column to each of the two or more tasks comprising the cumulative volume due during the time interval;
 display, on a graphical user interface, a visualization of the cumulative volume due and a cumulative planned curve representing the volume of tasks to be performed across one or more time intervals;
 in response to a selection of a time interval on the display of the graphical user interface, the computer is further configured to display a pop-up display representing worker information;
 clicking and dragging the cumulative planned curve on the graphical user interface to display cumulative volume and worker information within the pop-up display;
 in response to the clicking and dragging the cumulative planned curve on the graphical user interface, recalculating resources, corresponding to the clicking and dragging, to determine an increase in workers or a decrease in workers, wherein the determined increase in workers or the determined decrease in workers is displayed on the pop-up display; and
 autonomously complete, by robotic machinery, the two or more tasks, in response to assignment by the warehouse management system, wherein the two or more tasks comprise adjusting inventory at various stocking points.

2. The warehouse management system of claim 1, wherein the computer is further configured to overlay two or more priority levels over the display of the graphical user interface.

3. The warehouse management system of claim 1, wherein the computer is further configured to assign a priority to each of the two or more tasks by:
 grouping the two or more tasks and estimating a latest feasible start time of each group of tasks; and
 determining a priority based on the latest feasible start time.

4. The warehouse management system of claim 3, wherein the computer is further configured to assign the two or more tasks to two or more workers and assign schedules to the two or more tasks based, at least in part, on a due time of each of the two or more tasks.

5. The warehouse management system of claim 4, wherein assigning schedules to the two or more tasks is further based on an estimated duration of the two or more tasks and a skill set required to complete the two or more tasks.

6. The warehouse management system of claim 4, wherein the computer is further configured to assign the two or more tasks to robotic machinery to complete the two or more tasks based on an assigned schedule of completion of the two or more tasks.

7. A computer-implemented method, comprising:
 receiving two or more tasks from a task database comprising one or more attributes in a table format, the table having two or more rows and two or more columns;
 adding a column to each of the two or more tasks comprising a volume of tasks to be cumulatively performed during a time interval;
 adding a column to each of the two or more tasks comprising the cumulative volume due during the time interval;
 displaying, on a graphical user interface, a visualization of the cumulative volume due and a cumulative planned curve representing the volume of tasks to be performed across one or more time intervals;
 displaying a pop-up display representing worker information in response to a selection of a time interval on the display of the graphical user interface;
 clicking and dragging the cumulative planned curve on the graphical user interface to display cumulative volume and worker information within the pop-up display;
 in response to the clicking and dragging the cumulative planned curve on the graphical user interface, recalculating resources, corresponding to the clicking and dragging, to determine an increase in workers or a decrease in workers, wherein the determined increase in workers or the determined decrease in workers is displayed on the pop-up display; and
 autonomously completing, by robotic machinery, the two or more tasks, in response to assignment by a warehouse management system, wherein the two or more tasks comprise adjusting inventory at various stocking points.

8. The computer-implemented method of claim 7, further comprising overlaying two or more priority levels over the display of the graphical user interface.

9. The computer-implemented method of claim 7, further comprising assigning a priority to each of the two or more tasks by:
 grouping the two or more tasks and estimating a latest feasible start time of each group of tasks; and
 determining a priority based on the latest feasible start time.

10. The computer-implemented method of claim 9, further comprising assigning the two or more tasks to two or more workers and assign schedules to the two or more tasks based, at least in part, on a due time of each of the two or more tasks.

11. The computer-implemented method of claim 10, wherein assigning schedules to the two or more tasks is further based on an estimated duration of the two or more tasks and a skill set required to complete the two or more tasks.

12. The computer-implemented method of claim 10, further comprising assigning the two or more tasks to robotic machinery to complete the two or more tasks based on an assigned schedule of completion of the two or more tasks.

13. A non-transitory computer-readable medium embodied with software, the software when executed configured to:

receive two or more tasks from a task database comprising one or more attributes in a table format, the table having two or more rows and two or more columns; add a column to each of the two or more tasks comprising a volume of tasks to be cumulatively performed during a time interval;

add a column to each of the two or more tasks comprising the cumulative volume due during the time interval; display, on a graphical user interface, a visualization of the cumulative volume due and a cumulative planned curve representing the volume of tasks to be performed across one or more time intervals;

in response to a selection of a time interval on the display of the graphical user interface, the software is further configured to display a pop-up display representing worker information;

clicking and dragging the cumulative planned curve on the graphical user interface to display cumulative volume and worker information within the pop-up display;

in response to the clicking and dragging the cumulative planned curve on the graphical user interface, recalculate resources, corresponding to the clicking and dragging, to determine an increase in workers or a decrease in workers, wherein the determined increase in workers or the determined decrease in workers is displayed on the pop-up display; and autonomously complete, by robotic machinery, the two or more tasks, in response to assignment by a warehouse management system, wherein the two or more tasks comprise adjusting inventory at various stocking points.

14. The non-transitory computer-readable medium of claim 13, wherein the software is further configured to overlay two or more priority levels over the display of the graphical user interface.

15. The non-transitory computer-readable medium of claim 13, wherein the software is further configured to assign a priority to each of the two or more tasks by:

grouping the two or more tasks and estimating a latest feasible start time of each group of tasks; and determining a priority based on the latest feasible start time.

16. The non-transitory computer-readable medium of claim 15, wherein the software is further configured to assign the two or more tasks to two or more workers and assign schedules to the two or more tasks based, at least in part, on a due time of each of the two or more tasks.

17. The non-transitory computer-readable medium of claim 16, wherein assigning schedules to the two or more tasks is further based on an estimated duration of the two or more tasks and a skill set required to complete the two or more tasks.

* * * * *